United States Patent [19]

Wildenrotter

[11] 4,245,895
[45] Jan. 20, 1981

[54] SUPPORTING STRUCTURE FOR REFLECTORS, SOLAR CELLS OR SOLAR CELL CARRIERS

[75] Inventor: Karl Wildenrotter, Munich, Fed. Rep. of Germany

[73] Assignee: M.A.N. Maschinenfabrik Augsburg-Nürnberg Aktiengesellschaft, Munich, Fed. Rep. of Germany

[21] Appl. No.: 4,367

[22] Filed: Jan. 18, 1979

[30] Foreign Application Priority Data

Jan. 24, 1978 [DE] Fed. Rep. of Germany ....... 2802914

[51] Int. Cl.³ ............................................... G02B 5/08
[52] U.S. Cl. .................................. 350/310; 126/438; 350/292; 136/244
[58] Field of Search .............. 350/288, 292, 293, 296, 350/299, 310; 343/912; 126/438; 136/89 P

[56] References Cited

U.S. PATENT DOCUMENTS 3,977,773  8/1976  Hubbard ............................ 350/292

Primary Examiner—F. L. Evans
Attorney, Agent, or Firm—Scully, Scott, Murphy & Presser

[57] ABSTRACT

Supporting structure for reflectors consisting of interconnected supporting bars arranged in parallel spaced relationship, having the reflectors mounted thereon side by side in a single plane. The length of the bars is at a maximum the width of one reflector. At least two of these supporting bars are interconnected through transversely directed cross-members which, in turn, are fastened onto a central upright extending essentially parallel to the supporting bars.

7 Claims, 3 Drawing Figures

SUPPORTING STRUCTURE FOR REFLECTORS, SOLAR CELLS OR SOLAR CELL CARRIERS

BACKGROUND OF THE INVENTION

1. Field of the Invention

The present invention relates to a supporting structure for reflectors, solar cells or solar cell carriers, hereinafter collectively referred to as reflectors, consisting of interconnected profiled and/or tubularly shaped bars on which the reflectors are arranged adjacent each other and fastened in a single plane.

2. Discussion of the Prior Art

Reflector installations of this type are employed, for example, in the recovery of energy from sun rays, wherein the reflectors serve for the focusing of the sun rays or, in the case of solar cell installations, for converting the radiation energy directly into electrical energy. Installations of this type which are erected in the open, are exposed to high wind loads and thermal stresses, as well as to deformations in the supporting structure.

SUMMARY OF THE INVENTION

Accordingly, it is a basic object of the present invention to provide a supporting structure of the abovementioned type which is adapted to receive the reflectors and to safely secure them together against all occurring loads in the required geometric array as independently as possible of load conditions.

A more specific object of the present invention resides in the provision of a supporting structure equipped with supporting bars in spaced, parallel arrangement which carry the reflectors, with the bars extending in length for a maximum the width of one reflector, and wherein at least two of these supporting bars are connected to each other through crosswise oriented arms which, in turn, are themselves attached to a central upright extending essentially in parallel to the supporting bars.

In this manner, each reflector may have associated therewith a set of supporting bars which are supported by a transversely extending arm, the supporting bars being supported only by the central upright. This structure is flexible in its entirety and has the reflectors arranged therein in an individual suspension. Flexural and thermal loads acting on the individual components are largely prevented from being transmitted to other elements whereby the system and particularly the reflectors, which may be constituted of glass, plastic, aluminum or the like, will be exposed to only minimal stresses notwithstanding the high loads.

Moreover, because of its minimal use of materials, the supporting structure is of a low weight. A further advantage consists of in that the supporting structure forms predetermined modular units which can be employed in any suitable aggregate to provide the desired size of the installation.

The length of the central upright determines the length of a row of reflectors of which, pursuant to a further aspect of the present invention, several are connected in spaced arrangement adjacent each other to a base member or pedestal formed of one or more tubes or profiled bars, in order to thereby arrange a plurality of rows of reflectors adjacent to each other.

The supporting bars, arms and central uprights may similarly be produced from profiled bars or tubes to thereby impart to the system its requisite stability.

Pursuant to a further aspect of the present invention, the transmission of stresses from the supporting bars to the reflectors is inhibited as extensively as possible by effecting the connection between the supporting bars and the reflectors through individual resilient fastening elements which, at one end thereof, are connected to the supporting bar, and at the other end, to the rear side of the reflector. This will obviate the need for reflector frames or other supporting components. Concurrently, this type of arrangement will allow for an optimization of the stress distribution. As a result of the uniform distribution of these fastening elements over the reflector surface area, wherein there is also maintained a predetermined spacing from the edge of the reflector, there is also minimized the deflection of the reflectors under loading.

BRIEF DESCRIPTION OF THE DRAWINGS

Reference may now be had to the following detailed description of preferred embodiments of a supporting structure for reflectors constructed pursuant to the invention, taken in conjunction with the accompanying drawings; in which.

DETAILED DESCRIPTION

Figure 1:
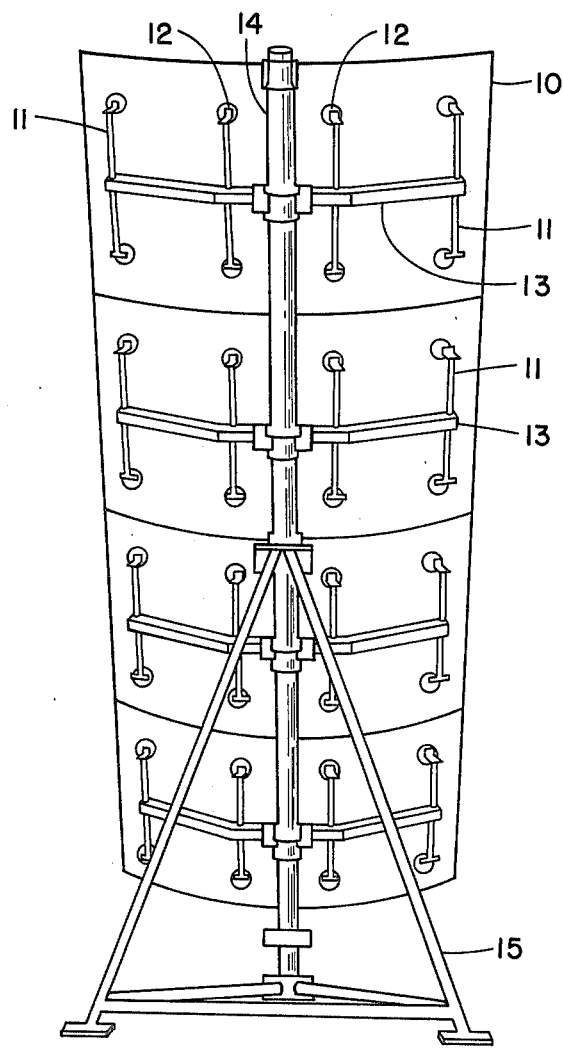
FIG. 1 is an elevational perspective view of a first embodiment of the invention.

Referring to the drawings, FIG. 1 illustrates a row of reflectors which is constituted of four parabolic reflectors 10. Each reflector has four supporting bars 11 associated therewith, which are each connected to the rear side of the reflector 10 through the intermediary of two fastening elements 12. The four supporting bars 11 are retained together by means of a suitably bent arm 13. The length of the supporting bars 11 and their mutual spacing are selected so that the connecting points with the reflector, which in this embodiment are made at the ends of the supporting bars, are essentially uniformly distributed over the surface of the reflector. Hereby avoided are relatively large bending angles between the connecting points as well as at the edge of the reflector.

The arms 13 which are associated with the individual reflectors 10 are fastened to a centrally arranged upright 14 for the formation of the row of reflectors, the upright being maintained with a pedestal or base 15 in the desired orientation.

In lieu of four supporting bars there can also be provided three or only two for each reflector in order to be able to still further reduce the transmission of any stresses from the arm 13 to the reflector plate 10. However, it is also possible to employ the arrangement of the supporting structure illustrated in FIG. 1 for reflectors distributed along an axis extending in parallel with the central upright 14.

Figure 2:
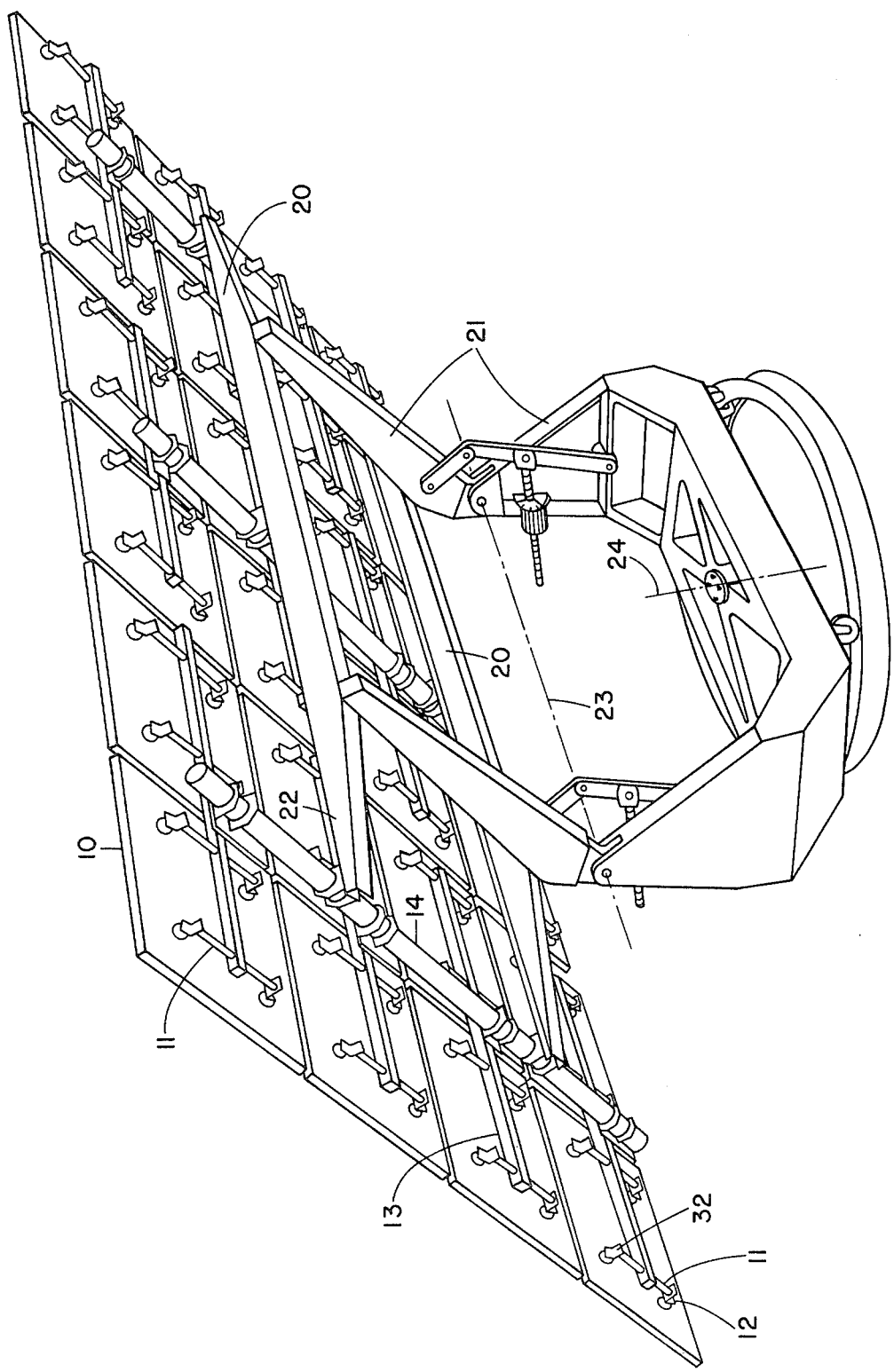
FIG. 2 is a perspective view of a second embodiment of the invention.

A distribution of that type is shown in the embodiment of FIG. 2, in which a plurality of rows of reflectors as in FIG. 1 are arranged adjacent each other and are retained together through a suitable base pedestal assembly 20, 21. In this embodiment, the supporting structure serves for the mounting of planar reflectors 10, in which use is made of the same components as in FIG. 1 except for the arms 13'. In this instance, the arms 13' are straight and carry each two reflector plates 10'. The central uprights 14 are fastened to two cross-members 20 of the pedestal by means of flanges 22, where the spacing between the two cross-members 20 and their distance relative to the respective ends of the central uprights 14 are also so selected that a minimal deformation of the system takes place under load.

The cross-members 20, together with the pedestal 21, are arranged so as to be pivotable about a horizontal axis 23 and a vertical axis 24 whereby the installation can be set up at its desired orientation and, particularly when used for sun collector installations, may be adjusted to follow the track of the sun.

Figure 3:
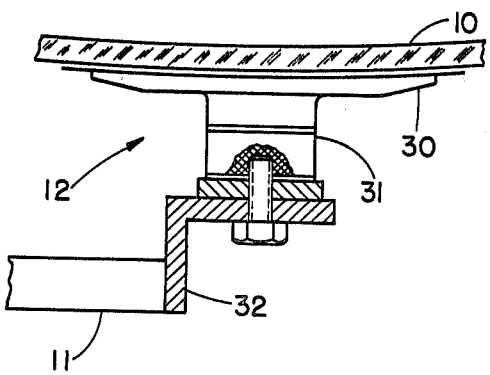
FIG. 3 is an enlarged fragmentary section of the inventive supporting structure.

Due to the individual suspension of the reflectors and the more or less independent supporting bars, the system has a predetermined flexibility relative to flexural loads which can be occasioned by wind, thermal expansion and other forces. Finally, the flexible connections 12 serve to assure that an adequate equilibrium is also created between the pair of supporting bars 11 which assume the movements of the arm 13'. These fastening elements, illustrated in detail in FIG. 3, consist of a preferably circular plate 30 which is adhered to the rear side of the reflector, and which supports on its other side a flexible rubber or plastic pad 31. A mounting angle iron 32 which is bolted or otherwise attached to the end of the supporting bar 11, is screwed to the flexible pad 31 in order to connect the supporting bar 11 with the fastening element 12. This connection is accurately adapted and adjusted by means of slots formed in the angle iron 32.

The supporting structure is constructed as either a welded or a welded and bolted construction, wherein the subassembly formed by the arms, supporting bars and angle irons is preferably welded together. For the joining operations there can be provided devices which facilitate the manufacturing tolerances of also more widely spaced apart structural elements to be maintained as small as possible in the interest of closer final adjustments of the reflectors.

What is claimed is:

1. In a supporting structure for reflectors including interconnected supporting bars, said reflectors being arranged and fastened adjacent each other in one plane on said bars, the improvement comprising: said supporting structure being equipped with said supporting bars in spaced, parallel arrangement for carrying said reflectors, said bars extending in length over a distance shorter than the width of a reflector; cross-members interconnecting at least two of said bars at a time; and a central upright having said cross-members attached thereto and extending essentially in parallel with the supporting bars; and resilient mount means connecting said supporting bars to the rear side of said reflectors to allow freedom of movement of the reflectors.

2. Supporting structure as claimed in claim 1, said supporting bars being profiled elements.

3. Supporting structure as claimed in claim 1, said supporting bars being tubular elements.

4. Supporting structure as claimed in claim 1, comprising a pedestal supporting a plurality of said central uprights with associated arms, cross-members and supporting bars in an adjacent spaced, parallel arrangement whereby a plurality of said reflectors is arranged in a side-by-side relationship.

5. Supporting structure as claimed in claim 1, said mount means being arranged on said reflector at predetermined spacings, each said mount means including an angle iron connected to the end of an associated supporting bar and a resilient pad adhesively fastened to the rear side of the reflector.

6. In a supporting structure for solar cells including interconnected supporting bars, said solar cells being arranged and fastened adjacent each other in one plane on said bars, the improvement comprising: said supporting structure being equipped with said supporting bars in spaced, parallel arrangement for carrying said solar cells, said bars extending in length over a distance shorter than the width of a solar cell; cross-members interconnecting at least two of said bars at a time; and a central upright having said cross-members attached thereto and extending essentially in parallel with the supporting bars; and resilient mount means connecting said supporting bars to the rear side of said solar cells to allow freedom of movement of the solar cells.

7. In a supporting structure for solar cell carriers including interconnected supporting bars, said solar cell carriers being arranged and fastened adjacent each other in one plane on said bars, the improvement comprising: said supporting structure being equipped with said supporting bars in spaced, parallel arrangement for carrying said solar cell carriers, said bars extending in length over a distance shorter than the width of a solar cell carrier cross-members interconnecting at least two of said bars at a time; and a central upright having said cross-members attached thereto and extending essentially in parallel with the supporting bars; and resilient mount means connecting said supporting bars to the rear side of said solar cell carriers to allow freedom of movement of the solar cell carriers.

* * * * *